US010110023B2

(12) United States Patent
Magagnin et al.

(10) Patent No.: US 10,110,023 B2
(45) Date of Patent: Oct. 23, 2018

(54) POWER SUPPLY SYSTEM

(71) Applicants: Politecnico Di Milano, Milan (IT); Manodya Limited, Dublin (IE)

(72) Inventors: Luca Magagnin, Milan (IT); Vincenzo Tirella, Dublin (IE)

(73) Assignees: Manodya Limited, Dublin (IE); Politecnico Di Milano, Milan (IT)

( * ) Notice: Subject to any disclaimer, the term of this patent is extended or adjusted under 35 U.S.C. 154(b) by 134 days.

(21) Appl. No.: 15/137,604

(22) Filed: Apr. 25, 2016

(65) Prior Publication Data
US 2016/0315485 A1    Oct. 27, 2016

(30) Foreign Application Priority Data

Apr. 24, 2015   (WO) ................. PCT/EP2015/058889

(51) Int. Cl.
| | |
|---|---|
| *H02J 3/46* | (2006.01) |
| *H02J 7/00* | (2006.01) |
| *B60L 11/18* | (2006.01) |
| *H02J 7/35* | (2006.01) |

(Continued)

(52) U.S. Cl.
CPC ......... *H02J 7/0024* (2013.01); *B60L 11/1853* (2013.01); *B60L 11/1864* (2013.01); *H02J 7/007* (2013.01); *H02J 7/0013* (2013.01); *H02J 7/0063* (2013.01); *H02J 7/0068* (2013.01); *H02J 7/35* (2013.01); *H02J 7/0075* (2013.01); *H02J 7/345* (2013.01); *H02J 2007/105* (2013.01);
(Continued)

(58) Field of Classification Search
CPC ...... H02J 7/0024; H02J 7/0013; H02J 7/0063; H02J 7/0068; H02J 7/007; H02J 7/25; H02J 7/0075; H02J 7/345; Y02T 10/7005; Y02T 10/7055; Y02T 10/7061
USPC ........................................................ 307/20
See application file for complete search history.

(56) References Cited

U.S. PATENT DOCUMENTS

| | | | |
|---|---|---|---|
| 5,481,174 A | 1/1996 | Martin et al. | |
| 6,043,628 A | 3/2000 | Perelle et al. | |
| 6,087,039 A | 7/2000 | Van Lerberghe | |

(Continued)

FOREIGN PATENT DOCUMENTS

| | | |
|---|---|---|
| EP | 0769837 | 4/1997 |
| JP | 2000-324709 A | 11/2000 |

(Continued)

OTHER PUBLICATIONS

"United Kingdom Application No. GB1607170.6, Combined Search and Examination Report dated Nov. 24, 2016", (Nov. 24, 2016), 7 pgs.

(Continued)

*Primary Examiner* — Ryan Jager
(74) *Attorney, Agent, or Firm* — Schwegman Lundberg & Woessner, P.A.

(57) ABSTRACT

A power supply system for supplying an electrical load using a pulse discharge arrangement. The power supply system comprises a first electrical battery for supplying said electrical load, a control unit configured to control the first electrical battery for periodically switching between a discharge state of the first electrical battery and a rest state of the first electrical battery, said control unit being further configured to control a power source for supplying a first charging current to the first electrical battery during a rest period when the first electrical battery is in the rest state.

12 Claims, 8 Drawing Sheets

(51) Int. Cl.
*H02J 7/10* (2006.01)
*H02J 7/34* (2006.01)

(52) U.S. Cl.
CPC ........ *Y02T 10/7005* (2013.01); *Y02T 10/7055* (2013.01); *Y02T 10/7061* (2013.01)

(56) References Cited

U.S. PATENT DOCUMENTS

| | | | |
|---|---|---|---|
| 6,340,879 | B1 | 1/2002 | Blacker |
| 6,741,065 | B1* | 5/2004 | Ishii .................... B60L 11/1816 320/122 |
| 9,379,549 | B2* | 6/2016 | Sakuma ..................... H02J 3/32 |
| 2007/0259218 | A1* | 11/2007 | Tung ................. H01M 8/04559 429/9 |
| 2007/0268001 | A1* | 11/2007 | Doll ...................... H02J 7/0024 320/134 |
| 2009/0295330 | A1* | 12/2009 | Li ........................ H02J 7/0013 320/124 |
| 2010/0117452 | A1* | 5/2010 | Dunnmon ................. H02J 1/10 307/72 |
| 2013/0033114 | A1 | 2/2013 | Lee et al. |
| 2013/0175975 | A1* | 7/2013 | Shinozaki ........... B60L 11/1864 320/106 |
| 2013/0346762 | A1* | 12/2013 | Hodges ............. H01M 10/4257 713/300 |
| 2014/0312828 | A1* | 10/2014 | Vo ..................... H01M 10/4257 320/103 |
| 2016/0315485 | A1* | 10/2016 | Magagnin ............. H02J 7/0024 |
| 2017/0229876 | A1* | 8/2017 | Jhunjhunwala ....... H02J 7/0003 |

FOREIGN PATENT DOCUMENTS

| | | |
|---|---|---|
| WO | WO-1993015543 | 8/1993 |
| WO | WO-1998031088 | 7/1998 |
| WO | WO-01/37393 A1 | 5/2001 |
| WO | WO-2009/146337 A1 | 12/2009 |
| WO | WO-2010076608 | 7/2010 |
| WO | WO-2012/163661 A1 | 12/2012 |

OTHER PUBLICATIONS

"International Application Serial No. PCTEP2015058889, International Search Report dated Dec. 21, 2015", 5 pgs.

"International Application U.S. Appl. No. PCTEP2015058889, Written Opinion dated Dec. 21, 2015", 9 pgs.

"International Application Serial No. PCTEP2016/059209, International Search Report dated Jun. 28, 2016", 4 pgs.

* cited by examiner

POWER SUPPLY SYSTEM

The invention relates to a power supply system comprising an electrical battery for supplying an electrical load. In particular, the invention relates to a power supply system and/or control system that can enhance the efficiency of operation of a battery.

BACKGROUND

Batteries are ubiquitous in modern day technology. Batteries are available in a wide range of types, each specialised for particular applications, from small button cell batteries used in watches, larger Li-ion batteries used in mobile devices, to large industrial scale batteries. There is often a trade-off between the physical size of the battery versus the capacity required for the battery's application, the two of which are directly related.

An important subclass of batteries is rechargeable batteries, which provide the functionality of being able to be used repeatedly. Rechargeable batteries are the power source of choice for most portable applications, from cellphones and tablets, to electric motors for hybrid or electric vehicles. However, their limited capacity means that once their charge is expended they need to be connected to an external power source in order to be recharged. For applications such as hybrid or electric vehicles this puts a limit on the range these vehicles can travel before having to be recharged, which may be less than desirable.

For cellphones, balancing the desire for batteries to be light and portable against the power drain of large LED displays and power hungry processors, leads to batteries that have to be charged almost daily. The charging process for these batteries is time consuming, typically requiring a few hours for a full charge. It is not always desirable to have to recharge these devices this frequently.

In addition, rechargeable battery performance can deteriorate as repeated charge and discharge cycles lead to damage to the battery's electrodes. Causes of such deterioration include sulfation and grid corrosion for lead acid batteries, cell oxidation for Li-ion batteries, and crystalline formations for nickel-based batteries. These result in it becoming harder for the battery to regain its initial charge with the capacity of the battery depleting over time.

There is therefore a need to improve the functionality of batteries in order to increase their capacity whilst being able to keep them portable enough for specific applications. In addition, more efficient charge and discharge cycles are desirable in order to keep up with development in electronics.

SUMMARY OF INVENTION

According to an aspect of the invention there is provided a power supply system for supplying an electrical load. The power supply system comprises: a first electrical battery for supplying said electrical load; and a control unit configured to control the first electrical battery for periodically switching between a discharge state of the first electrical battery and a rest state of the first electrical battery; said control unit being further configured to control a power source for supplying a first charging current to the first electrical battery during a rest period when the first electrical battery is in the rest state.

It has been found that this can improve the efficiency of the electrical battery. In particular, periodically switching between a discharge state and a rest state can increase the working time of the electrical battery in comparison to a system that involves continuous discharge. The efficiency of the battery can be increased further by supplying an electrical current during a rest period when the first electrical battery is in the rest state, when the battery is maintained at a high charge state.

One possible consequence of the improved efficiency is that the battery may need to be recharged less often. The battery remains at a higher charge state for longer and so the amplitude of any recharge (i.e. the amount of energy required for a recharge) is reduced. This may offer a further advantage because being recharged less often may lead to less degradation of the battery, increasing battery lifetime over consecutive charge/discharge cycles.

A further advantage of the power supply system is that the periodic alternating between a discharge state and a rest state results in a lower operating temperature of the battery. During discharge batteries may generate heat which can enhance degradation to battery components. Alternating between the discharge state and the rest state may mean that the increase in temperature of the battery is less than for continuous discharge.

The power supply system can be used to supply an electrical energy storage system, such as, for example, a storage battery present in a photovoltaic system (for example, of the domestic type) or a flow battery, which may not require constant power output.

Preferably, the control unit is configured to control said power source by generating a power control signal for controlling the power source between an ON state and an OFF state. When in the ON state the power source supplies a charging current to the first electrical battery. When in an OFF state the power source does not supply a charging current to the first electrical battery. This may allow coordination of the various charge/discharge/rest states to ensure that the correct timing period is used.

Preferably, the power source is configured to control said power source by generating a power control signal for controlling a switch connecting the power source and the first electrical battery during the rest period.

In one arrangement the control unit is configured to control the power source to supply current to the first electrical battery only during the rest period. Alternatively, or in addition, the control unit is further configured to control the power source for supplying said first charging current to the first electrical battery, or any other connected battery: from the beginning of the rest period; at the end of the rest period; throughout substantially the entire rest period; only during a portion of the rest period and/or intermittently during the rest period.

The control unit may be configured to control the power source to supply a varying current to the first electrical battery or any other connected battery. This varying current can change over the portion of the current injection period. Alternatively, the current can vary between different current injection periods during one rest period. Alternatively, the control unit may be further configured to control the power source to supply a continuous current to the first electrical battery or any other connected battery.

The power supply system may comprise a second electrical battery. The control unit may be further configured to control the second electrical battery for periodically switching between a discharge state of the second electrical battery and a rest state of the second electrical battery. Advantageously, having a second electrical battery provides a further energy source for the power supply. A third and further electrical batteries may be provided as required by the circumstances.

Preferably, the control unit is configured for periodically switching between said first and second electrical batteries to alternate the discharge state of the first battery and the discharge state of the second electrical battery. Advantageously, the power source alternates between supplying current to the load from a first battery whilst the second battery is in its rest state, and to the power source supplying current from the second battery to the load, whilst the first battery is in its rest state. This may be useful in applications that require a constant supply of electrical power. Preferably, the electrical output across the load from the power supply system is substantially continuous.

Preferably, the control unit is further configured to control the power source to supply a second charging current to the second electrical battery during a rest period when the second electrical battery is in the rest state. It has been shown that supplying a current to the second battery during its rest state results in an increase in efficiency of the power supply system compared to conventional pulse discharge.

In one arrangement the control unit is configured to control the power source to supply current to the second electrical battery only during the rest period. Alternatively, or in addition, the control unit is further configured to control the power source for supplying said first charging current to the second electrical battery: from the beginning of the rest period; at the end of the rest period; throughout substantially the entire rest period; only during a portion of the rest period and/or intermittently during the rest period.

Preferably, the power supply further comprises at least a third electrical battery, wherein the control unit is further configured to control the at least third electrical battery for periodically switching between a discharge state of the at least third electrical battery and a rest state of the at least third electrical battery.

Preferably, the control unit is further configured to control the power supply to supply at least a third charging current to the at least third electrical battery when the at least third electrical battery is in the rest state.

Preferably, the batteries can be any type of electrochemical accumulator of electrical energy. Any of the batteries can be a rechargeable battery or a primary battery. More preferably the first or second or third battery is any of: a NiHM battery, a NiCd battery, a Li-ion battery, a LIPO battery, a supercapacitor, an electrolytic capacitor, a flow battery. In a specific power supply system the plurality of batteries may be of different types.

Each of the batteries may be represented by a bank of a plurality of batteries connected in series, where the voltage across the terminals of the battery bank is equal to the sum of the voltages across the serial connection of the plurality of batteries. Alternatively, the battery may be a bank of one or more batteries connected in parallel, wherein the voltage across the terminals of the battery bank is equal to the voltage across the terminals of each battery. The bank of batteries supplies current to the load during the discharge phase.

The electrical load can be any of: a printed circuit board inside a smartphone or tablet or laptop or music player, the electric motor of an electric or hybrid vehicle, a system for storing electrical energy, an electrical energy distribution network (for example of the "smart grid" type).

Preferably, the switching signal has a duty cycle of 50%, such that the duration of the discharge state is approximately equal to the duration of the rest state. In a power supply system comprising two batteries, the switching cycles may be approximately inverse to one another. Thus, for half of a switching period one of the batteries is connected to the load and is discharging. For the other half of the switching period the battery is not connected to the load and is in the rest state. The discharge period and the rest period may therefore be equal for each battery. Advantageously, for the power supply system comprising two or more batteries this may enable the power system to provide a continuous power output.

Preferably, for the power supply system with two batteries the power source is supplied by an electrical output of the power supply system. Whilst one battery is being discharged a portion of its output can be supplied to the other battery which is in its rest state. Therefore, a power supply system with a high charge can be maintained for a longer period. This is also suitable for power supply systems containing a plurality of batteries that are switched between. This has applications as an energy storage power supply, where a high level of charge is desirable, with an output only required occasionally.

The power source may be any of electric motor, the output of an inverter, a kinetic energy recovery system (KERS), a photovoltaic panel, or a battery. Advantageously, the range of power sources can be adapted for the specific use of the power supply system. KERS and photovoltaic panels are green sources. This is advantageous as these sources may not provide a continuous output sufficient to drive a load. However, they provide current sufficient for applying to the battery during the rest phase. This has a positive impact on the environment compared to non-green sources.

In another aspect of the invention there is provided a control unit comprising: a processor; and a switching generator configured to generate a switching signal for periodically switching between a discharge state of a first electrical battery and a rest state of said first electrical battery; wherein the control unit is further configured to generate a power signal for controlling a power source to supply a current to the first electrical battery when the first electrical battery is in the rest state.

According to another aspect of the invention there is provided a battery control unit comprising: a first switch; a first switching generator configured to generate a switching signal for periodically operating the first switch for switching an electrical battery between a discharge state and a rest state; a second switch; and, a second switching generator configured to generate a switching signal for periodically operating the second switch to control a power source to supply a current to the electrical battery during a rest period when the electrical battery is in the rest state.

Preferably, the first and second switching generators are integrated within a single signal generator.

According to another aspect of the invention there is provided a method of controlling a battery and a power source comprising the steps of: periodically switching between a discharge state of a first electrical battery and a rest state of a first electrical battery; and controlling a power source for supplying a first charging current to the first electrical battery during a rest period when the first electrical battery is in the rest state.

According to another aspect of the invention there is provided a method of supplying an electrical load, the method comprising the steps of: providing a first electrical battery for supplying said electrical load; and periodically switching between a discharge state of the first electrical battery and a rest state of the first electrical battery; supplying a first charging current to the first electrical battery from a power source during a rest period when the first electrical battery is in the rest state.

According to yet another aspect of the invention there is provided a device for driving an electrical load, the device comprising: a control unit configured to generate a switching signal indicating a periodic selection alternating between a first supply voltage signal and a second supply voltage signal; a switch configured to: receive the first supply voltage signal and the second supply voltage signal; generate a supply voltage signal for the electrical load; wherein the supply voltage signal is selected between the first supply voltage signal and the second supply voltage signal as a function of the value of the switching signal, so as to periodically supply the electrical load, alternatively, with the first supply voltage signal or with the second supply voltage signal.

There is also provided a power supply system for supplying an electrical load, the system comprising: a first accumulator of electrical energy configured to generate the first supply voltage signal; a second accumulator of electrical energy configured to generate the second supply voltage signal; a driving device according to a third aspect of the invention; wherein the first electrical energy accumulator and the second electrical energy accumulator are selected from among the following:

a battery;
a battery bank connected in series or in parallel;
a capacitor;
a supercapacitor;
a voltage generator.

Preferably, the power supply system further comprises a power supply circuit configured to at least partially recharge the first electrical energy accumulator, when the control unit is configured to generate the switching signal indicating the selection of the second supply voltage signal.

Preferably, the power supply circuit is further configured to at least partially recharge the second electrical energy accumulator, when the control unit is configured to generate the switching signal indicating the selection of the first supply voltage signal.

Preferably, the power supply circuit is configured to recharge the first electrical energy accumulator and the second electrical energy accumulator such that the state of charge of the first electrical energy accumulator and of the second electrical energy accumulator is comprised between 90% and 100%.

Advantageously, the increase in power generated by the power supply system can be used as the charging current. Therefore, a power supply system with a high charge can be maintained for a longer period. This has applications as an energy storage power supply, where a high level of charge is desirable, with an output only required occasionally. It has been found that charging the battery during the rest state when the battery has a high charge increases the efficiency of the power supply system when compared to a pulse discharge system with no charging.

The present invention relates to a pulse discharge system wherein the battery of a power supply system can be supplied with a current during the rest phase of the pulse discharge. This power supply system allows for a fixed voltage interval at a constant current more electrical power to be provided over a longer working time. Alternatively, for a fixed working time at a constant current more electrical power is provided with lower battery discharging.

DETAILED DESCRIPTION

Figure 1A:
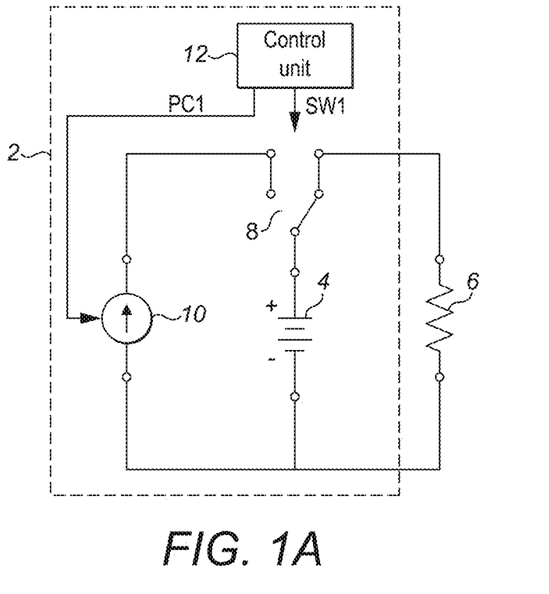
FIGS. 1A and 1B show simplified circuit diagrams of an example power supply system in an embodiment of the present invention.
Figure 1B:
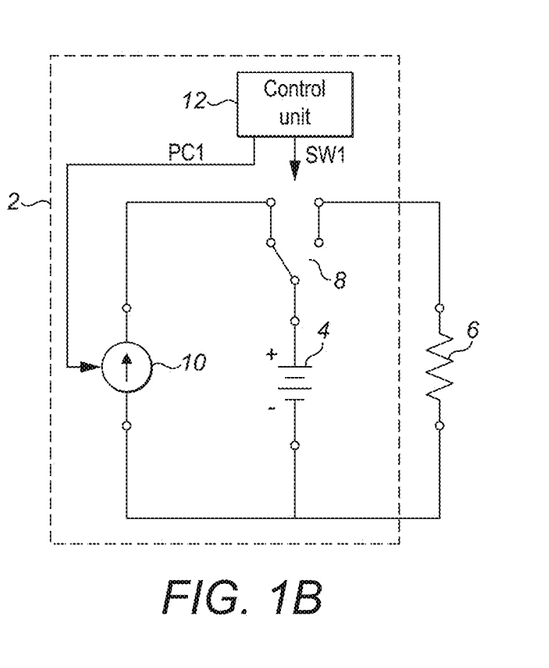

FIGS. 1A and 1B are simplified circuit diagrams of an example power supply system 2. The power supply system 2 includes a battery 4 which is connected in series to a load 6 by a two way switch 8. The power supply 2 system drives the load by supplying an electrical current. A power source 10 is connected to the other terminal of the two way switch 8. FIG. 1A shows the circuit in the configuration where the two-way switch 8 is connected to the load 6 so that the battery 4 supplies power to the load 6. FIG. 1B shows the alternative arrangement where the two way switch 8 is connected to the power source 10 so that the battery 4 can be recharged. The control unit 12 is configured to generate a switching signal SW1. The switching signal SW1 activates the switch 8 causing it to switch periodically between its two positions.

In FIG. 1A when the switch 8 is closed between the battery 4 and the load 6, current flows from the battery 4 to the load 6. This results in a discharge of the battery 4 during the time period that it is connected to the load 6. The switch 8 is open between the battery 4 and the power source 10, and therefore the power source 10 does not supply any electrical current to the battery 4.

In FIG. 1B the switching signal SW1 generated by the control unit 12 has caused the switch 8 to change orientation compared to in FIG. 1A. The switch 8 is now open between the battery 4 and the load 6. In this case the battery 4 is no longer connected to the load 6 and no current flows from the battery 4 to the load 6. The battery 4 is no longer discharging and is in a rest state. The switch 8 is closed between the battery 4 and power source 10; the power source 10 can then supply current to the battery 4 for a portion of the time that it is connected.

The control unit 12 further controls the power source 10 to supply an electric current for a certain period during the rest state by generating a power control signal PC1 to control the power source between an ON and an OFF state. The power source 10 is connected to the terminals of the battery 4 such that the supply of current to the battery 4 from the power source 10 causes a charging effect to occur.

The control unit 12 causes periodic switching of the switch 8 during discharge of the battery 4. This creates a pulsed discharge of the battery 4 with charging during a portion of the rest state.

Figure 2A:
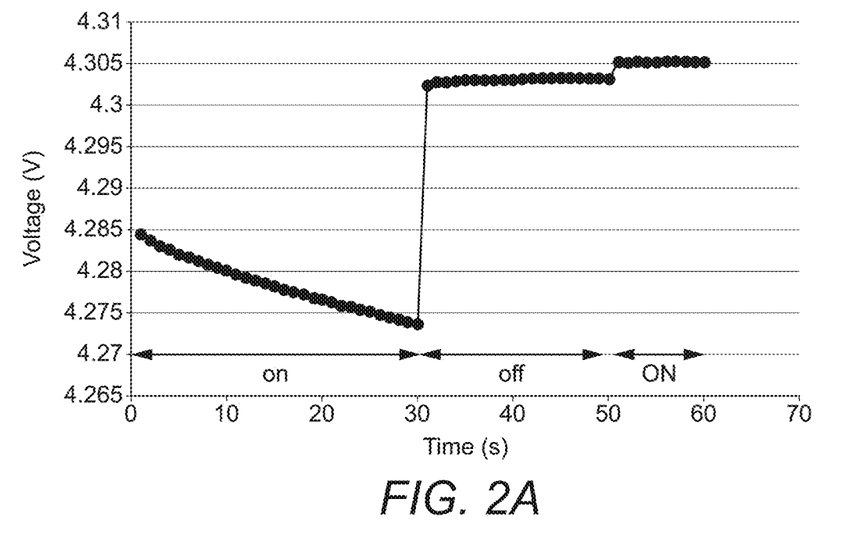
FIG. 2A is a graph showing the voltage across a battery terminal during one switching cycle for the example power supply system as shown in FIGS. 1A and 1B.

FIG. 2A is a graph showing the voltage across a battery 4 terminal during one switching cycle for the power supply system 2. At t=0 the battery 4 is connected to the load 6 and starts discharging. Between t=0 and t=30 s the battery 4 is connected to the load 6 and is in the discharge state for a discharge period, $T_{on}$. During the discharge period the voltage across the battery 4 decreases. At t=30 s the battery 4 is disconnected from the load 6 when the two-way switch 8 is switched to its alternate position. The battery 4 remains disconnected from the load 6 in this rest state for a rest period between t=30 s and t=60 s. At the beginning of the rest period the voltage across the battery 4 increases rapidly, since the load 6 has been disconnected. The voltage across the battery 4 then increases gradually over the remainder of the rest period. Between t=50 and t=60 a current is injected into the battery 4 by the power source 10 under control of the control unit 12. This is termed a current injection period, and it results in an additional voltage increase across the battery 4. The rest period therefore comprises a recovery period during which the battery 4 is disconnected from the load 6 but is not supplied with a current, and a current injection period where the battery 4 is disconnected from the load 6 and a current is supplied by the power source 10.

The switching cycle has a switching period $T_c$ that is defined as the SUM of the discharge period $T_{on}$, and the rest period $T_r$. As explained above, the rest period comprises the recovery period $T_{off}$ and the current injection period $T_{ON}$. Thus:

$$T_r = T_{off} + T_{ON}$$

and $$T_c = T_r + T_{on}$$

Figure 2B:
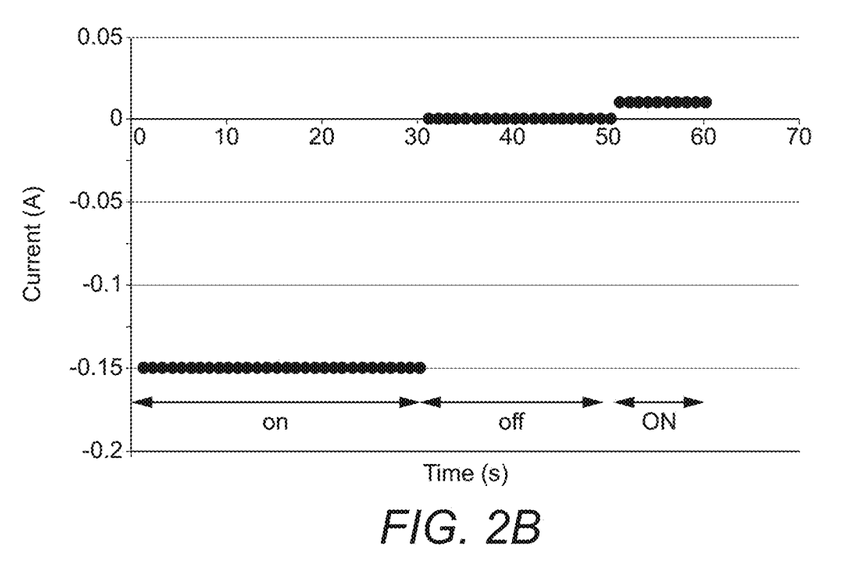
FIG. 2B is a graph showing the current with respect to the battery terminal during one switching cycle for the power supply system as shown in FIGS. 1A and 1B.

FIG. 2B is a graph showing the current supplied at one of the terminals of the battery 4 for one switching cycle. Between t=0 and t=30 during the discharge period the battery 4 discharges at constant current ($I_{on}$). Between t=30 and t=50 (the recovery period) the battery 4 is disconnected from the load 6, and no current is supplied to the battery 4 from the power source 10; therefore, during the recovery period the current is zero ($I_{off}$=0). Between t=50 and t=60 (the current injection period) a current is supplied to the battery 4 by the power source 10; the current measured at the terminal of the battery 4 during the current injection period $I_{ON}$.

Figure 3A:
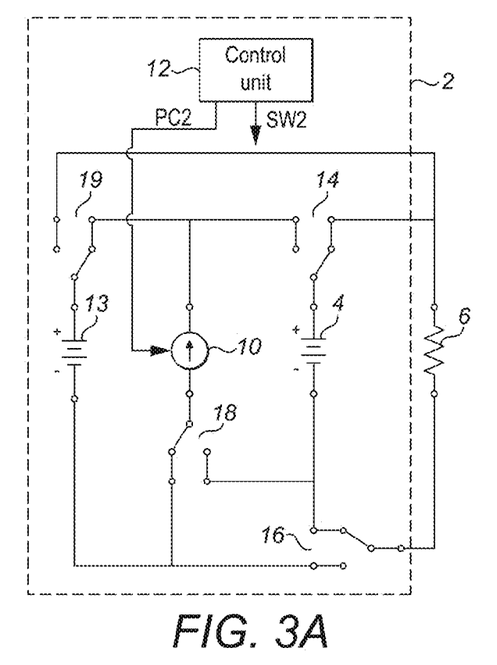
FIGS. 3A and 3B show simplified circuit diagrams of a second example of a power supply system in another embodiment of the present invention.
Figure 3B:
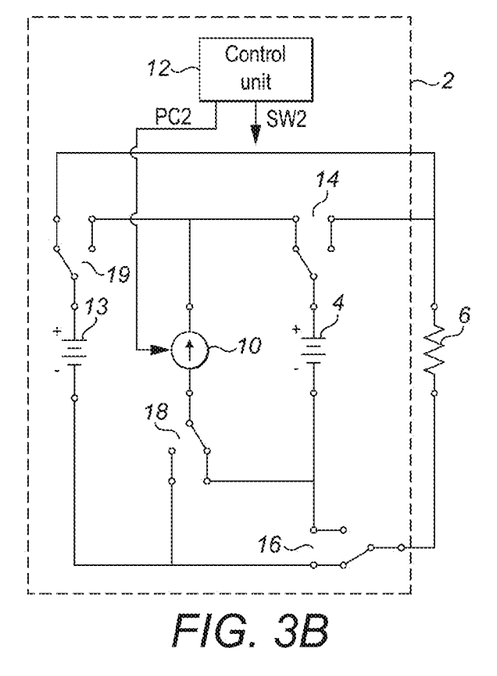

FIGS. 3A and 3B show simplified circuit diagrams of another example of a power supply system 2 for supplying an electrical current to a load 6. The power supply system 2 includes a second battery 13, in addition to the first battery 4 as shown in the example power supply system 2 in FIGS. 1A and 1B.

As is apparent from FIG. 3A, the first battery 4 can be connected in series with the load 6 by selected operation of two-way switches 14, 16. The second battery 13 is connected in series with the power source 10 through selected operation of two-way switches 18, 19. It is noted that, with the two-way switches 14, 16, 18, 19 in the configuration shown in FIG. 3A, the second battery 13 is disconnected from the load 6, and the first battery 4 is disconnected from the power source 10.

FIG. 3B shows an alternative switching configuration. In this arrangement the first battery 4 is connected in series to the power source 10 through selected control of the two-way switches 14, 18. The second battery 13 is connected in series to the load 6 through selected control of the two-way switches 16, 19. In this switching configuration the first battery 4 is not connected to the load 6, and the second battery 13 is not connected to the power source 10.

In this example the control unit 12 of the power supply system 2 supplies a switching signal SW2 to the two-way switches 14, 16, 18, 19 in order to switch between the first battery 4 being connected to the load 6 and the second battery 13 being connected to the load 6. In this way, only one of the batteries 4, 13 is arranged to discharge by supplying a current to the load 6 at any one time. The first battery 4 is in the discharge state whilst the second battery 13 is in the rest state, and the first battery 4 is in the rest state whilst the second battery 13 is in the discharge state. The control unit 12 is also arranged to generate a power control signal PC2 to control the power source 10 in order to supply an electric current to each of the batteries 4, 13 during a portion of their respective rest states.

The switching cycle for the power supply system 2 shown in FIGS. 3A and 3B is equal and symmetric between the discharge and rest phase; thus $T_{on}=T_r$. The duty cycle of the switching signal is 50%. For the example in FIGS. 3A and 3B this results in a constant current output from the respective batteries 4, 13, with the load 6 alternately supplied with current from the first battery 4 and the second battery 13. Advantageously, this is useful for systems requiring a continuous supply of power. The configuration described in this embodiment can readily be scaled to integrated more than two batteries operating in a coordinated way so that at any given time, only a portion of batteries are in a discharge stage while the others are in a rest stage during which a current is supplied by the power source. The configuration of batteries can also be adjusted to supply any specific current signal to the load.

Figure 4:
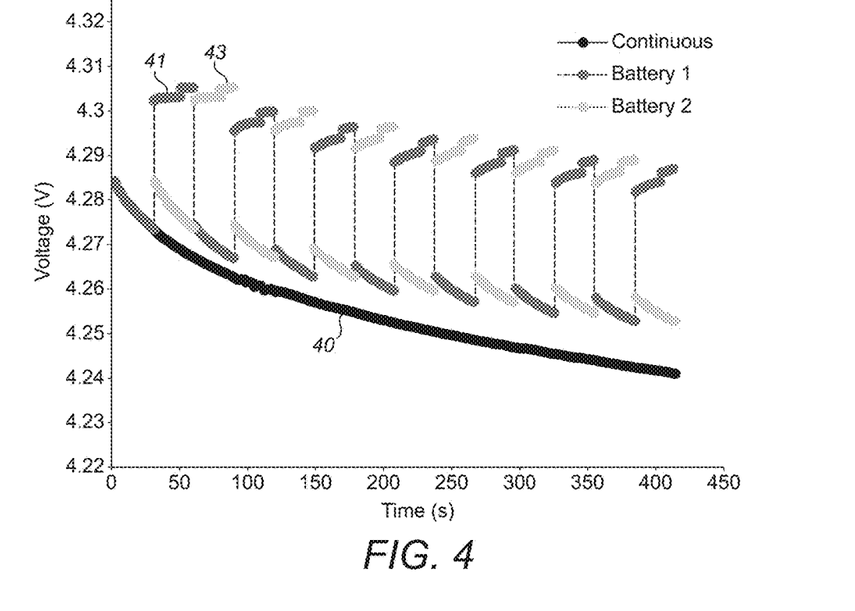
FIG. 4 is a graph showing a section of a voltage versus time discharge curve for the system shown in FIGS. 3A and 3B, and for a conventional system.

FIG. 4 is a graph showing the voltage across the first and second batteries 4, 13 versus time; these are shown in trace 41 and trace 43 respectively. A trace 40 is also shown for the voltage across a conventional battery versus time, where there is no pulsed discharge. In a conventional battery discharge the voltage across the battery gradually decreases over time. The traces 41, 43 for the first and second batteries 4, 13 follow the shape of FIG. 2A for a single switching cycle. However, the traces 41, 43 are out of phase such that the first battery 4 is in its rest state while the second battery 13 is in its charging state, and vice-versa. In each successive switching cycle the respective voltages across the first and second batteries 4, 13 are lower than in the previous cycle. Thus, there is a downward trend in the voltage values for successive switching cycles in the traces 41, 43. However, the downward trend in voltages is less for traces 41, 43 than for trace 40 which represents a conventional battery discharge. This indicates an improved efficiency of operation for the first and second batteries 4, 13 using the describe charge/discharge cycle.

Figure 5:
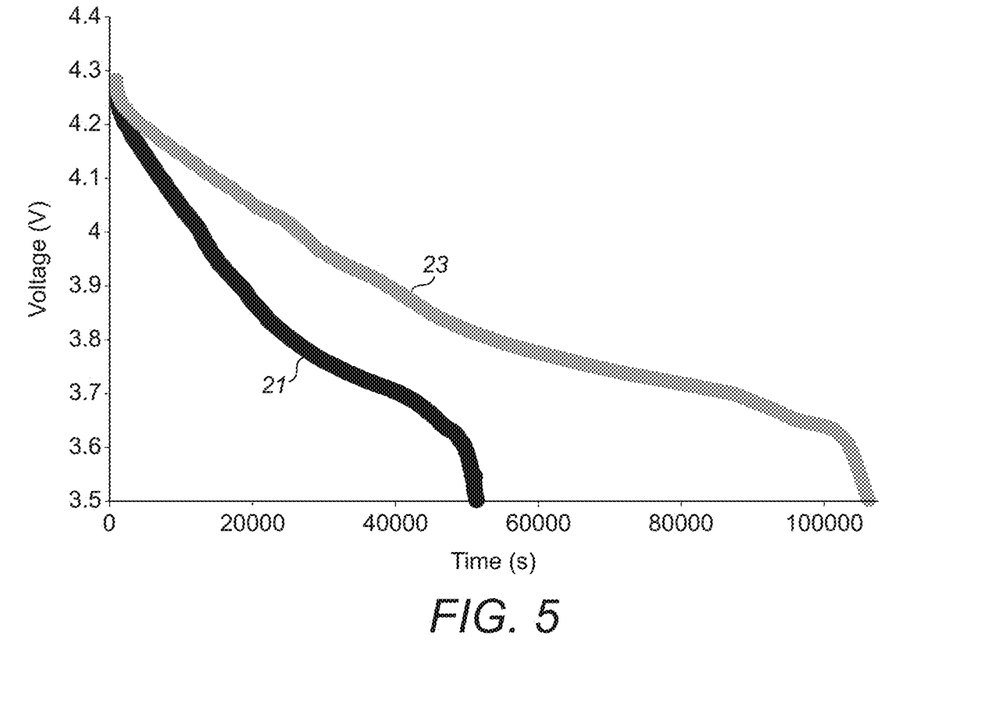
FIG. 5 is a graph showing a complete discharge profile of a voltage versus time discharge curve for the system shown in FIGS. 3A and 3B, and for a conventional system.

FIG. 5 is another graph showing the voltage across the first and second batteries 4, 13 over a longer time period. A plot is also shown for the voltage across a conventional battery versus time, where there is no pulsed discharge. The trace 23 represents the voltage across the first and second batteries 4, 13; this corresponds to the traces 41 and 43 shown in FIG. 4, but over an extended time period. The trace 21 shows the voltage across a conventional battery with no pulsed discharge. As can be seen from FIG. 5 the trace 23, representing the voltages of the first and second batteries 4, 13, has a much shallower gradient.

For the first example power system shown in FIGS. 1A and 1B, and the second example power system shown in FIGS. 3A and 3B, the power source 10 can be configured to supply current to the battery 4 at any point during the rest period of a battery. More specifically, the intermediate charging period $T_{ON}$ can be set to occur at any point during the rest period $T_t$ of that particular battery. In alternatives, the control unit 12 may control the power source 10 to supply electricity to the respective battery 4, 13 during the entire rest period, at the and of the rest period, at the beginning of the rest period, only during a portion of the rest period. There could also be intermittent charging during the rest period; this may include at the end, at the beginning, or at various times throughout the rest period. In the case of the current being intermittently supplied during the rest period the current may be supplied for various time periods during one rest period.

A number of alternative timing schedules may be applied by the control unit 12. In one arrangement the discharge period may last from 10-90 seconds. The rest phase may have a duration of 1-180 s. The current injection period may have a duration of 1-90 s. A further rest period may be provided at the and of the current injection period with a duration of 0-5 s. The current supplied to the battery 4 by the power source 10 during the current injection period may be less than 70% of the current provided by the battery 4 to the load 6 during the discharge period.

The efficiency of the power supply system can be determined in a number of different ways:

The net energy delivered by the battery during discharge may be calculated as follows:

$$E_{net} = E_{on} - E_{ON}$$

Where $E_{ON} = 0$ in case of continuous discharge. Starting from the net energy, the discharge efficiency is may be defined as the ratio between the net energy discharge of the switched battery power supply system ($E_{net,M}$) and the net energy of the continuous discharge battery ($E_{net,C}$).

$$\eta_{discharge} = E_{net,M} / E_{net,C}$$

Discharge/charge cycle efficiency:

$$\eta_{cycle} = E_{on} / (E_{ON} + E_{charge})$$

Where $E_{charge}$ is the energy required to charge the battery up to the initial voltage (arbitrarily set). As can be seen above the energy provided by the power source during the intermediate charging phase is taken into account in these calculations.

Table 2 provides some experimental results achieved using a single battery in the experimental arrangement shown in FIGS. 1A and 1B. These are then compared with results for a conventional battery with a continuous discharge, in the voltage interval V=4.35–3.5 V.

For all of the results shown in Table 2, multistep potentiometric analysis has been selected. The current is set constant in the time interval selected and the battery voltage evolution is recorded (data sampling time=1 s). It has to be noted that the voltage measured has two contributions ($V_m = V + \psi$): the battery voltage V and the ohmic contribution due to battery internal resistance and contact resistance $\psi = I^*(R_{int} + R_c)$. In order to have higher accuracy in the results obtained the contacts have been optimized to reduce this contribution. Energy calculation is performed from the current and voltage data recorded from the instrument. The Rectangle method has been employed for the area calculation Under the voltage curve evolution over time interval (V-t graph); the quantity obtained is subsequently multiplied by the charge/discharge current. By definition, the energy corresponding to a single sampling interval is equal to $E_s = V_m * A * t_C$ [Joule].

TABLE 2

| Battery type | Experiment | Discharge | $\eta_{cycle}$ | $\eta_{discharge}$ |
|---|---|---|---|---|
| Battery A | | | | |
| Li-ion | Continuous | −150 mA | 0.994 | Ref. |
| Li-ion | A | on 30 s −150 mA, off 20 s, ON 10 s +10 mA | 1.018 | 1.030 |
| Li-ion | B | on 10 s −150 mA, off 7 s, ON 3 s +10 mA | 1.015 | 1.032 |
| Li-ion | C | on 30 s −150 mA, off 20 s, ON 8 s +10 mA, ON 2 s +100 mA | 1.010 | 1.026 |
| Li-ion | D | on 30 s −150 mA, off 10 s, ON 10 s +10 mA, off 10 s | 1.000 | 1.000 |
| Battery B | | | | |
| Li-ion | Continuous | −150 mA | 0.920 | Ref. |
| Li-ion | E | on 90 s −150 mA, off 1 s, ON 84 s +100 mA, off 5 s | 0.917 | 0.878 |
| Li-ion | F | on 90 s −150 mA, off 1 s, ON 84 s +10 mA, off 5 s | 0.931 | 1.019 |
| Li-ion | G | on 90 s −150 mA, off 1 s, ON 84 s +1 mA, off 5 s | 0.927 | 1.014 |
| Li-ion | H | on 90 s −150 mA, off 1 s, ON 89 s +1 mA | 0.919 | 1.007 |
| Li-ion | Continuous | −500 mA | 0.984 | Ref. |
| Li-ion | I | on 10 s −500 mA, off 1 s, ON 8 s +1 mA, off 1 | 0.997 | 1.017 |

Experimental results indicate an increase in terms of efficiency of the charge/discharge cycle of the power supply system with respect to the continuous cycle as indicated by a larger $\eta_{cycle}$. The power supply system can also provide a higher amount of net discharged energy in a given voltage window, indicated by the larger $\eta_{discharge}$.

In another arrangement an experiment was performed to investigate the efficiency that could be obtained for an Energizer NiHM battery 1.2V 2300 mAh in the experimental set up of FIGS. 1A and 1B. The discharge of the battery was measured at a DC current of 1 A in a voltage range between 1.3V to 0.9V. Three experiments were performed. First, the switching cycle for the pulse discharge system with no current injection was a discharge period $T_{on} = 30$ s, and a rest period $T_{off} = 30$ s. Second, the switching cycle for the pulse discharge system with current injection was a discharge period $T_{on} = 30$ s on 1 A, a rest period $T_{off} = 20$ s, and a current injection period $T_{ON} = 10$ s at 0.05 A. Third, a continuous discharge was performed, for the purposes of comparison, with a current of 1 A.

The discharge/charge cycle efficiency $\eta_{cycle}$ was determined for each case. For the pulse discharge system with current injection $\eta_{cycle} = 0.91$. For the pulse discharge system with no current injection $\eta_{cycle} = 0.90$. For the continuous discharge system $\eta_{cycle} = 0.88$. In summary, these experiments determined that current injection during the rest period can increase the discharge/charge cycle efficiency.

For any given battery and battery configuration, the parameters that affect the efficiency of operation may be: the length of switching cycle, the discharge current, the charging current, and the combination of the three periods ($T_{on}$, $T_{ON}$ and $T_{OFF}$) considered in terms of duration and sequence. By varying these parameters it may be possible to optimise efficiency in different operational conditions.

It has been found that embodiments of the invention can provide a number of advantages. First, more electrical power can be provided with a longer working time than would be expected from a continuous discharge, for a fixed voltage interval with a constant current. Second, more electrical power can be provided with the battery discharging less, for a fixed working time at a constant current.

The power source 10 can be any type of device which is capable of providing an electric current to a battery 4. This could be any type of energy storage device that is capable of delivering a current over time, for instance a battery or a capacitor. The power source could also be any type of renewable energy source that is capable of supplying a current such as a photovoltaic system, or a wind turbine.

The power source may provide DC or AC, depending on the requirements of the load 6. Where AC is required an inverter (not shown) may be provided.

The power source could alternatively be the output from a kinetic energy recovery system (KERS) where the kinetic energy generated during the breaking process can be captured and turned into electrical energy. Alternatively, the output of a combustion engine can cause an electrical generator to generate a current. This power supply system is suitable for use in hybrid and electric vehicles.

Figure 6A:
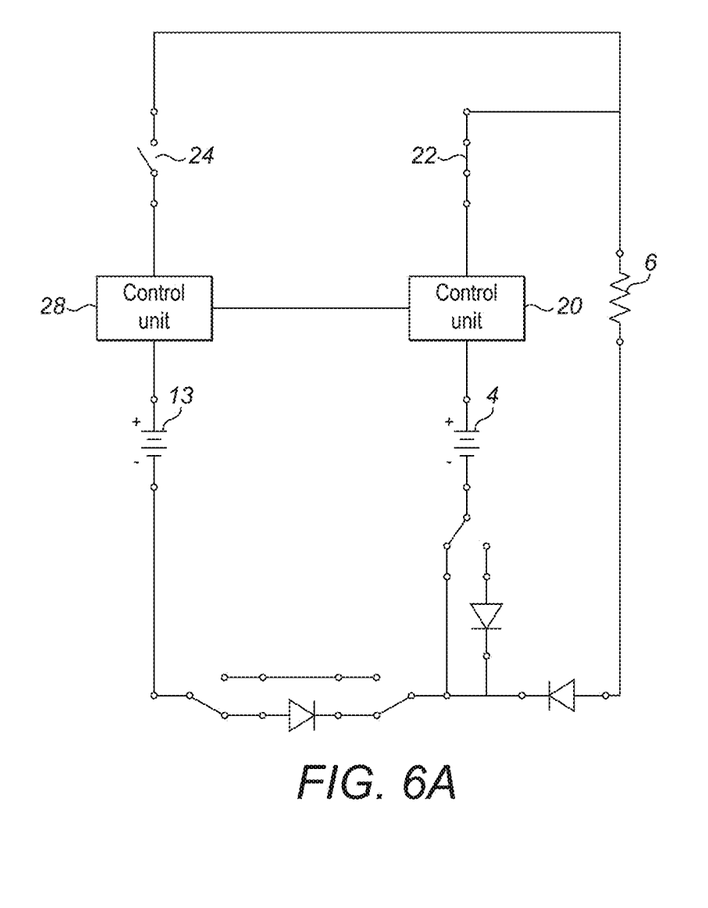
FIGS. 6A and 6B shows simplified example circuit diagrams of a power supply system in another embodiment of the present invention.
Figure 6B:
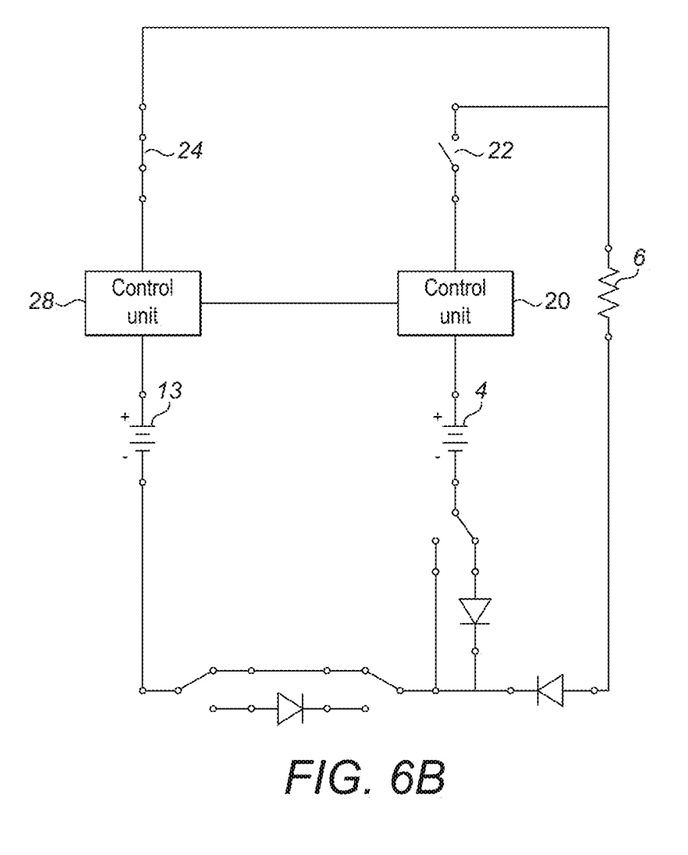

FIGS. 6A and B are simplified example circuit diagrams of another power supply system including a first battery 4 which is connected in series to a first control unit 20 and to a load 6 through a switch 22. A second battery 13 is connected to a second control unit 28 and is connected to the load 6 through another switch 24. The first control unit 20 is connected to the second control unit 28. The control units 20, 28 may be separate units or may comprise a section of one larger control unit. A section of diodes and switches ensure that the current flows in the correct direction. FIG. 6A shows the configuration where the switch 22 connects the load 6 to the first battery 4. FIG. 6B shows an alternative arrangement where the switch 22 is open and the switch 24 is closed so that the second battery 13 supplies current to the load 6.

In FIG. 6A when the switch 22 is closed current flows from the first battery 4 through the first control unit 20 to supply power to the load 6. The first control unit 20 receives a portion of this current and supplies it to the second control unit 28, which supplies this current in turn to the second battery 13. This causes the second battery 13 to recharge. The second battery 13 is not connected to the load 6 during charging because the switch 24 is open. The control units 20, 28 control the supply of current to the second battery 13 such that the second battery 13 is only supplied with current for the period of the time that it is not connected to the load 6. A number of diodes and switches ensure that the current is supplied in the correct orientation as the skilled person would readily understand.

In FIG. 6B the switching signal generated by the control units 20, 28 has caused all the switches to change orientation compared to FIG. 6A. The switching signal could be generated by either or both of the control units 20, 28. The switch 22 is now open between the first battery 4 and the load 6. The first battery 4 is no longer discharging and is in a rest state. The switch 24 is closed and the second battery 13 is supplying current to the load 6. A portion of the current from the second battery 13 is supplied to the first control unit 28 which supplies this to the first control unit 20. In this configuration the first control unit 20 supplies current to the first battery 4 for a portion of the rest state so that it recharges.

In this system, current from the battery that is in the discharge state can be supplied to the other battery that is in the rest state, during its current injection phase. In this arrangement energy from one battery is recycled to charge the other battery. It has been found that by having a short switching cycle this enables the system to maintain a high level of charge over a longer period than conventional pulse discharge systems. This may be suitable for applications which require intermittent access to a power system with a high level of charge over a long period. Further, it has been observed that when the power supply system is maintained in a high charged state supplying current during the rest state can lead to the efficiency of the system being increased further, compared to when no current is supplied to the battery.

The first or second control unit 20, 28 can be a microcontroller, a microprocessor or a programmable logic device (for example, a FPGA=Field Programmable Gate Array). Preferably, the control unit and switch is implemented with a single component which is programmable logic device (for example FPGA) or an application-specific integrated circuit (ASIC).

The first or second control unit 20, 28 may generate a switching signal with a low logic signal indicating the selection of a discharge phase and a high logic value indicating the selection of the rest phase. Alternatively the low logic signal may indicate rest phase and high logic signal may indicate discharge phase.

Figure 7:
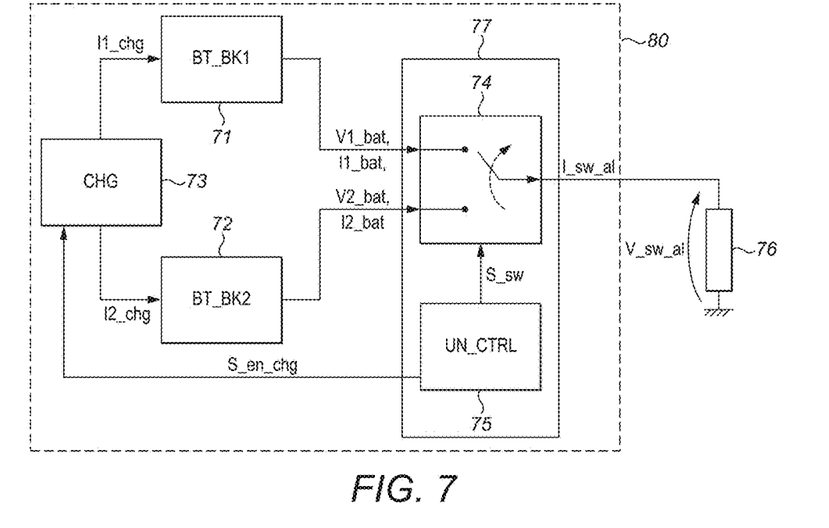
FIG. 7 shows a block diagram of a power supply system for supplying an electrical load in another embodiment of the present invention.

With reference to FIG. 7, it shows a block diagram of a system 80 for supplying an electrical load in another embodiment. The power supply system 80 of FIG. 7 includes a power supply circuit 73 having the function of generating a first charging current I1_chg and a second charging current I2_chg to recharge the first electrical energy accumulator 71 and the second electrical energy accumulator 72, respectively, when they are not connected to the electrical load 76.

In particular: when the first electrical energy accumulator 71 is connected to the electrical load 76 and the second electrical energy accumulator 72 is disconnected from the electrical load 76, the power supply circuit 73 is configured to generate the first charging current I1_chg having a substantially null value and generate the second charging current I2_chg having a value greater than zero so as to recharge the second electrical energy accumulator 72;

when the first electrical energy accumulator 71 is disconnected from the electrical load 76 and the second electrical energy accumulator 72 is connected to the electrical load 76, the power supply circuit 73 is configured to generate the first charging current I1_chg having a value greater than zero so as to recharge the first electrical energy accumulator 71 and generate the second charging current I2_chg having a substantially null value.

In this embodiment the absolute values V_max, V_min, I_max have substantially constant values even after a large number of switching cycles; consequently, the voltage across the terminals of the electrical load 76 has a trend that is substantially constant over time equal to V_min and the value of the current flowing in the electrical load 76 likewise has a trend that is substantially constant over time equal to I_max.

The electrical energy consumed by the power supply circuit 73 can be received from an electrical energy source external to the power supply system 80, such as, for example, from: an electric motor;
  the output of an inverter, in case that an inverter is interposed between the power supply system 80 and the electrical load 76;
  a KERS system (Kinetic Energy Recovery System) in case that the power supply system 80 is mounted on an electric vehicle;
  the output of a photovoltaic panel, in case that the power supply system is used in a photovoltaic system, for example of a domestic type.

Preferably, the first charging current I1_chg and/or the second charging current I2_chg have a pulse trend.

Alternatively, the electrical energy consumed by the power supply circuit 73 is received from the first electrical energy accumulator 71 and/or from the second electrical energy accumulator 72; in this case, the output terminal of the switch 74 is connected to an input terminal of the power supply circuit 73, or the output terminal of the switch 74 is connected to the output terminal of the first electrical energy accumulator 71 and/or to the output terminal of the second electrical energy accumulator 72.

Advantageously, according to a variant of this embodiment the control unit 75 is configured to generate the switching signal S_sw having a switching period T1_c calculated such that the state of charge of the first electrical energy accumulator 71 and of the second electrical energy accumulator 72 is comprised between 90% and 100%; in this way the power supply system 80 forms a voltage generator.

In other words, the value of the switching period T1_c is selected to be sufficiently short so that the state of charge of the first electrical energy accumulator 1 and of the second electrical energy accumulator 72 is very high.

For example, the value of the switching period T1_c is calculated as a function of the value of V_max, whose variation must be less than 10%.

Therefore, in the variant of the third embodiment the absolute values V_max, V_min and I_max are comprised in a range of values which is sufficiently small.

For example, in the case wherein the first and the second energy accumulator are implemented with banks composed of 40 batteries of the lead-acid type serially connected, each battery having a nominal voltage equal to 2.35 Volts (thus the value of the nominal voltage across the terminals of the first bank 71 and second bank 72 is equal to 94 Volts), the maximum voltage value is comprised between 87 and 94 Volts, the minimum voltage value is equal to about 71.8 Volts and the value I_max is comprised between 36 and 220 Amperes.

What is claimed is:

1. A power supply system for supplying an electrical load using pulse discharge, the system comprising:
  at least a first electrical battery and a second electrical battery for supplying current to said electrical load using pulse discharge; and
  a control unit configured to control each of the first electrical battery and the second electrical battery to pulse discharge by periodically switching between a discharge state having a discharge period when the respective electrical battery is connected to said electrical load, and a rest state when the respective electrical battery is disconnected from the electrical load and to periodically switch between the first electrical battery and the second electrical battery to alternate between a discharge state of the first electrical battery and a discharge state of the second electrical battery, said control unit being further configured during the pulse discharge to control a power source for supplying a first injection current to the first electrical battery during a first rest period when the first electrical battery is in the rest state and for supplying a second injection current to the second electrical battery during a second rest period when the second electrical battery is in the rest state,
  wherein the injection current supplied to each respective battery during a respective rest period for each respective battery is less than 70% of the current supplied by each battery to the load during a respective discharge period of each battery.

2. The power supply system according to claim 1, wherein the control unit is configured during pulse discharge to control said power source by generating a power control signal for controlling the power source between an ON state and an OFF state.

3. The power supply system according to claim 1, wherein the control unit is configured during pulse discharge to control said power source by generating a power control signal for controlling a switch connecting the power source and the first electrical battery during the first rest period.

4. The power supply system according to claim 1, the control unit is further configured during pulse discharge to control the power source for supplying said first injection current to the first electrical battery in at least one of:
  from the beginning of the first rest period;
  at the end of the first rest period;
  throughout substantially the entire first rest period;
  only during a portion of the first rest period;
  intermittently during the first rest period.

5. The power supply system according claim 1, wherein the control unit is further configured during pulse discharge to control the power source for supplying said second injection current in at least one of:
  from the beginning of the second rest period;
  at the end of the second rest period;
  throughout substantially the entire second rest period;
  only during a portion of the second rest period;
  intermittently during the second rest period.

6. The power supply system according to claim 1, further comprising:
  at least a third electrical battery,
  wherein the control unit is further configured during pulse discharge to control the at least third electrical battery for periodically switching between a discharge state of the at least third electrical battery and a rest state of the at least third electrical battery.

7. The power supply system according to claim 6, wherein the control unit is further configured during pulse discharge to control the power supply to supply at least a third injection current to the at least third electrical battery when the at least third electrical battery is in the rest state.

8. The power supply system according to claim 1, wherein the duration of the discharge state is approximately equal to the duration of the rest state.

9. The power supply system according to claim 1, wherein the electrical output across the load from the power supply system is substantially continuous.

10. The power supply system according to claim 1, wherein the power source is supplied by an electrical output of the power supply system.

11. The power supply system according to claim 1, wherein the power source is any of an electric motor, the output of an inverter, a kinetic energy recovery system (KERS), a photovoltaic panel, or a battery.

12. A control unit comprising;

a processor; and a switching generator configured to control each of a first electrical battery and a second electrical battery to pulse discharge, by generating a switching signal to periodically switch between a discharge state having a discharge period when the respective electrical battery is connected to an electrical load, and a rest state when the respective electrical battery is disconnected from the electrical load, and to periodically switch between the first electrical battery and the second electrical battery to alternate between a discharge state of the first electrical battery and a discharge state of the second electrical battery, wherein the control unit is further configured during the pulse discharge to generate a power signal to control a power source to supply a first injection current to the first electrical battery during a first rest period when the first electrical battery is in the rest state, and a second power signal to control the power source to supply a second injection current to the second electrical battery during a second rest period when the second electrical battery is in the rest state, wherein the injection current supplied to each respective battery during a respective rest period for each respective battery is less than 70% of the current supplied by each battery to the load during a respective discharge period of each battery.

* * * * *